United States Patent [19]

Krauss

[11] 4,417,832
[45] Nov. 29, 1983

[54] SILO FOR BULK MATERIAL

[75] Inventor: Werner Krauss, Hamburg, Fed. Rep. of Germany

[73] Assignee: Claudius Peters AG, Fed. Rep. of Germany

[21] Appl. No.: 254,209

[22] Filed: Apr. 14, 1981

[30] Foreign Application Priority Data

Apr. 14, 1980 [DE] Fed. Rep. of Germany ....... 3014206

[51] Int. Cl.³ .......................................... B65G 53/22
[52] U.S. Cl. .................................................. 406/90
[58] Field of Search ................. 406/88, 89, 90, 91; 34/57 C, 57 A, 57 R

[56] References Cited

U.S. PATENT DOCUMENTS 3,199,923  8/1965  Brooks ........................... 406/90 X

FOREIGN PATENT DOCUMENTS

| 939606 | 2/1956 | Fed. Rep. of Germany | 406/90 |
| 1150320 | 6/1963 | Fed. Rep. of Germany | 406/89 |
| 950033 | 2/1964 | United Kingdom | 34/57 C |
| 251460 | 1/1970 | U.S.S.R. | 406/90 |

*Primary Examiner*—Jeffrey V. Nase
*Attorney, Agent, or Firm*—Eric P. Schellin

[57] ABSTRACT

A silo for bulk material in which a cover defines at least one de-aerated space constituting a conveyor area accessible to the material to be conveyed, with at least one pneumatic conveyor chute extending at least partially in the conveyor area and toward an outlet opening, and an air-draining area above the conveyor area and beneath the cover, separated from the conveyor area by a partition that is permeable to air and checks the passage of the material.

3 Claims, 8 Drawing Figures

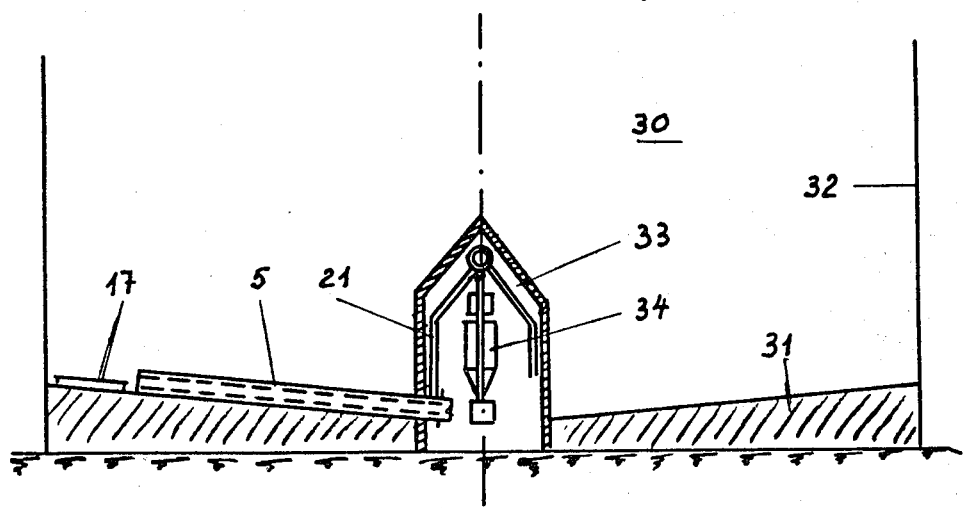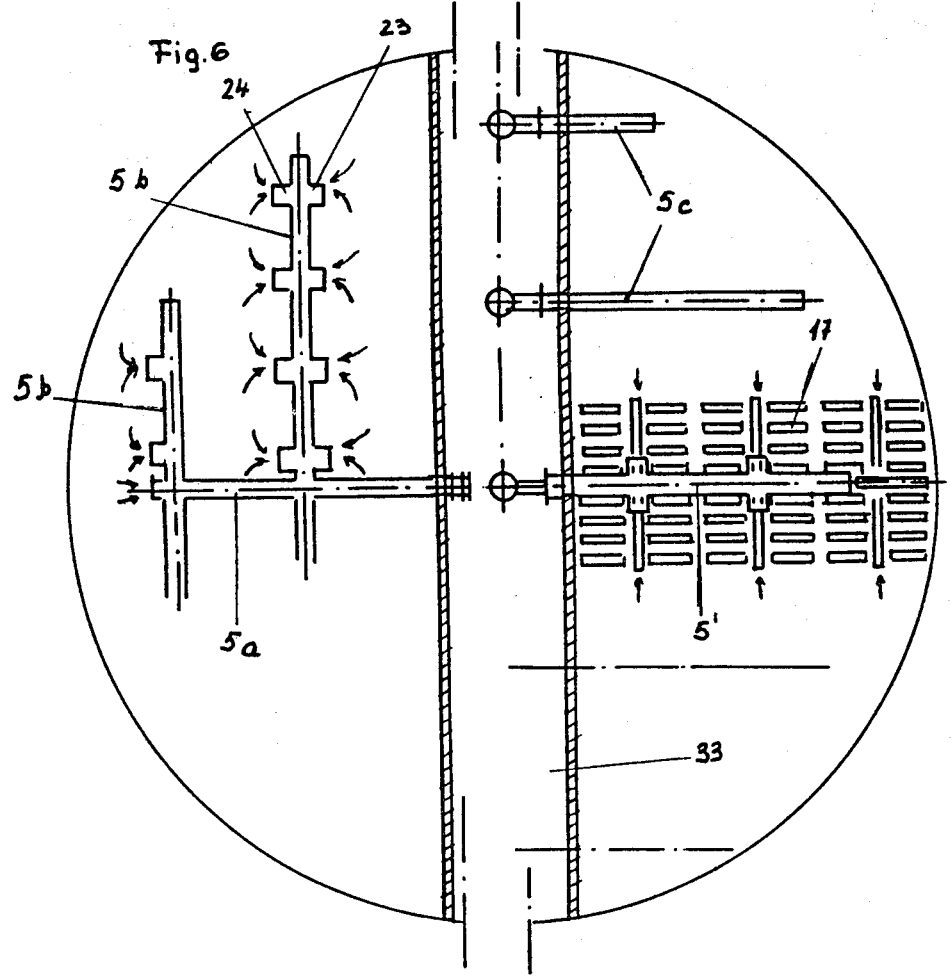

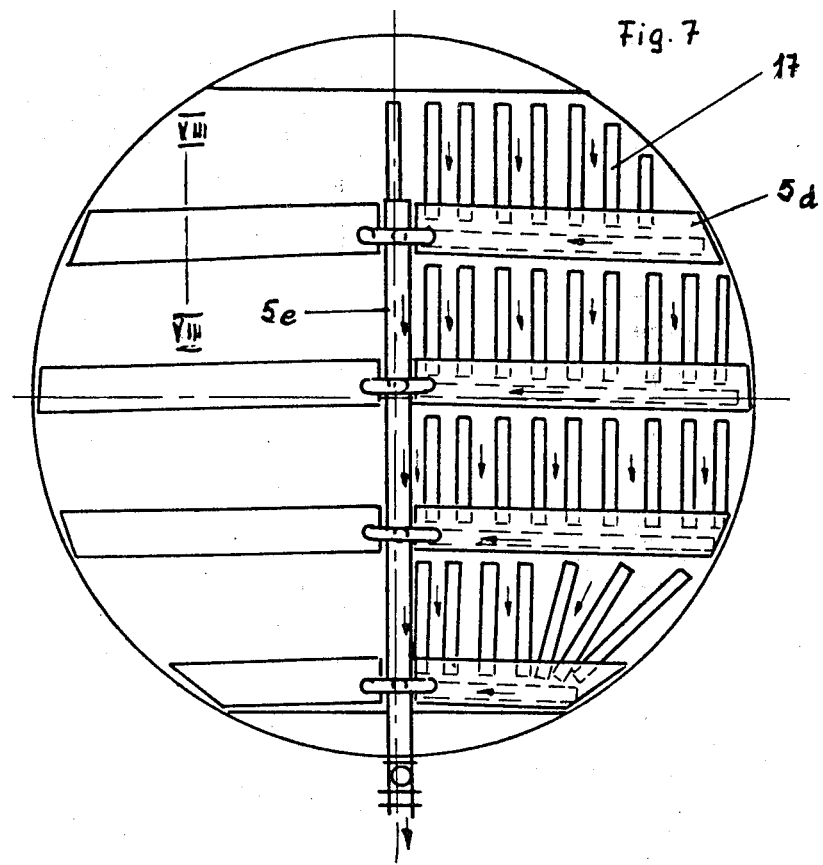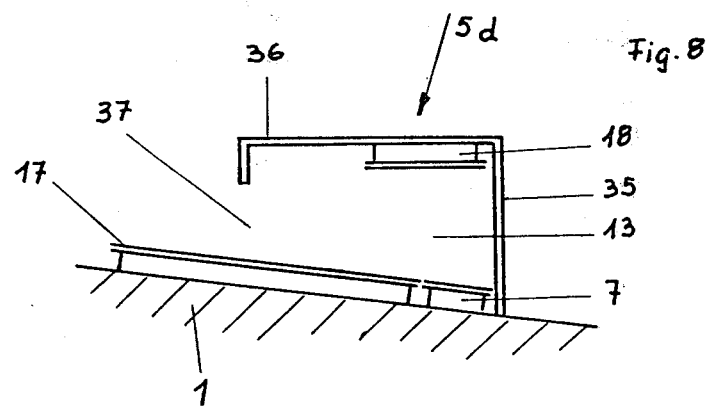

SILO FOR BULK MATERIAL

BACKGROUND OF THE INVENTION

1. Field of the Invention

The invention relates to a silo for bulk material with at least one pneumatic conveyor chute extending at least partially in a de-aerated space formed by a cover, toward an outlet opening. More particularly, the invention relates to such a pneumatic conveyor chute.

2. Prior Art

It is known to place pneumatic conveyor chutes upon the silo base which slopes gently toward the outlet opening, which conveyor chutes are to convey the material made flowable by finely distributed air supplied toward the outlet opening. It became manifest that openly placed pneumatic conveyor chutes can assure a uniform drain of the material over relatively short distances only, since primarily the material closest to the outlet opening is affected while for more distant material the loosening presure is not sufficient to overcome the resistances to the flow on the way to the outlet opening. By the employment of one or more expansion chambers (German Federal Republic Patent DE-PS 1,129,892) whose openings are distributed over the silo base in such a way that sufficiently short supply paths are produced, a uniform silo drain can be achieved. They are, however, relatively expensive because their height must be such that above the material level formed in these paths there remains a de-aerating space free of material. On the other hand, air conveyor chutes above which is provided at a small height (German Federal Republic Patent DE-PS 1,129,892, FIG. 8) a cover for the protection from the effect of the material load are only of limited success.

This applies also to closed conveyor chutes whose cover is perforated in places for the access of the material (German Federal Republic Application DE-OS 7 44 853). The reason is that they become completely filled with the material to be conveyed, in which process the resistance to flow and the pressure both rise, due to the growing air volume and the thereby increased velocity of flow toward the outlet opening, whereby the conveyance and the supply of further loosening air are checked.

SUMMARY OF THE INVENTION

The purpose of the invention is, therefore, the disclosure of a silo of the initially mentioned type that permits at lower cost an effective material drain with the aid of at least one pneumatic conveyor chute placed in the silo.

The solution of the invention consists in that an air draining chamber is provided above the conveyance area, accessible to the material to be conveyed, and separated by a partition that is permeable to air and checks the passage of the material.

Thereby, the result is achieved that even when the channel is of such a small height that its complete filling by the material to be conveyed can be expected, a continual expansion of the air toward the air draining area takes place above the material through the layer permeable to air. Within the air draining chamber the air can unimpededly flow off at high velocity from the material to be conveyed, while in the conveyance area a quiet, low-loss flow of the material to be conveyed with uniform high density can take place. Due to its small dimensions, the channel or cover, respectively, can be inexpensively manufactured and easily installed. This permits a uniform material drain at tolerable expense, even in silos with a high ratio between silo diameter and silo height.

The layer or partition that separates the air draining chamber from the conveyance area should be essentially impermeable to the material. It may consist, e.g., of the porous material that is usually employed for the finely distributed gas supply in pneumatic conveyor chutes. However, in some cases impermeability to the material is not a requirement of the invention because the effect strived for takes place even when the air drain area contains a small amount of material which does not check the rapid air drain. Accordingly, it is sufficient when the partition permeable to air merely checks the access of the material to the air drain area without blocking it entirely. The size of the air openings in the partition is suitably smaller than the medium grain diameter of the material. However, for the reasons indicated, it may in some cases also be larger since for the invention the decisive point is that the resistance to passage of the material be sufficiently greater than that for the air.

Advantageously, the layer or partition permeable to air is flexible so that it is automatically, without further action or changes of shape produced by pulsation devices, freed of adherent or intruding material. Instead of this, or in addition thereto, special purification devices may according to the invention also be provided for the partition permeable to air.

Preferably, the cover of the invention is channel-shaped, so that it can be combined with a conveyor chute in each case. Alternatively, it is possible to provide the cover with a large surface and to connect it with a plurality of conveyor chutes, in which structure the entire undersurface of the cover, or only a portion thereof, may be provided with air draining chambers.

According to a further characteristic of the invention, several conveyor chutes covered in a channel-shaped manner with a separate air draining chamber, end in a main-sized channel. This permits control and attendance of the chutes from the channel.

BRIEF DESCRIPTION OF THE DRAWINGS

The invention is explained in greater detail in the following with reference to the drawings, which illustrates advantageous embodiments, and wherein:

FIG. 5 is a cross section through the base area of a silo;

FIG. 6 is a plan view upon the silo base of FIG. 5, with different chute arrangements left and right;

FIG. 7 is a plan view upon a silo base with a further chute arrangement; and

FIG. 8 is a partial illustration enlarged with respect to FIG. 7, taken along line VIII—VIII thereof.

DETAILED DESCRIPTION OF THE PREFERRED EMBODIMENTS

Figure 1:
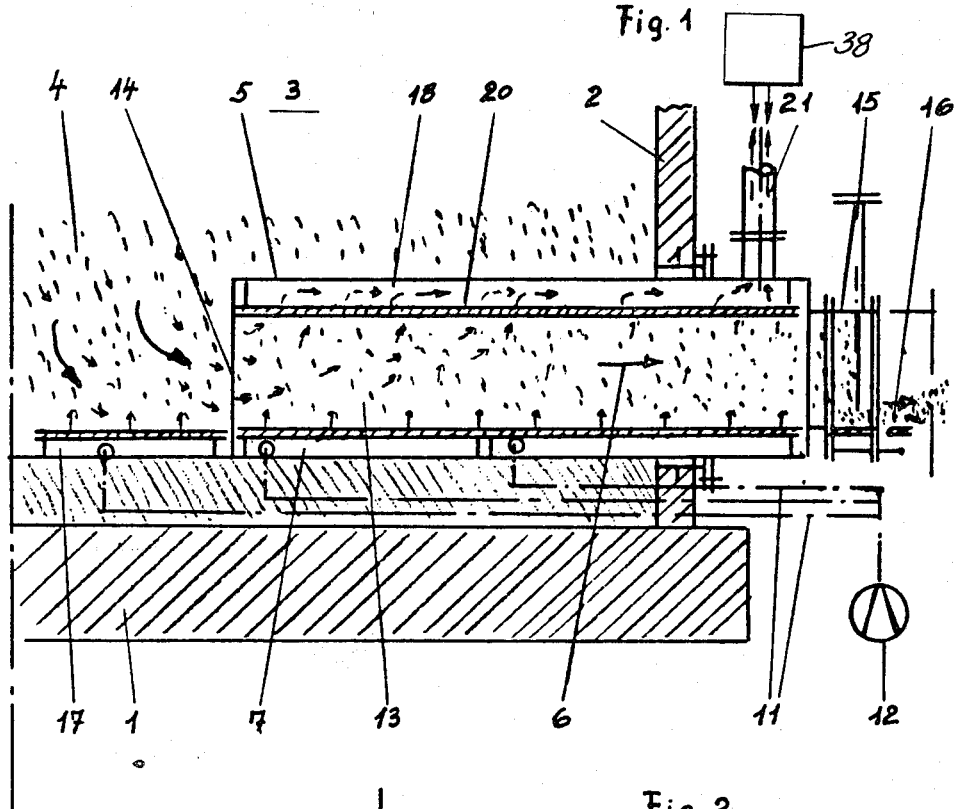
FIG. 1 is a longitudinal section through a channel within a silo arrangement.

FIG. 1 shows a silo base 1 and a wall 2 which delimits the silo space 3, containing the bulk material 4 indicated by dots and serves an an outer wall or as the wall of a built-in chamber. A channel 5 with a gentle slope in the direction of arrow 6 is placed upon the silo base, which channel is closed at least on the top and on the sides, but preferably also on the bottom side. It encloses the pneumatic conveyor chute 7 arranged on the bottom in a customary manner, consisting of a case 8 and a cover layer or partition 9 permeable to air, which jointly enclose the air supply space 10. Compressed air is fed to this air supply space 10 with the pressure customary in such cases (e.g., 0.5 bar) through a pipe line 11 from a blower 12, and therefrom the air enters through partition 9 in a finely distributed state through the material positioned above, in order to make it flowable, so that it is conveyed in the direction of arrow 6 within the conveyance area 13 of channel 5. The material enters conveyance area 13 through the open end 14 of channel 5 and departs from this area through the other end 16, which may be closable by a slide 15. For feeding material 4 to the conveyance area 13 of channel 5, further open feeding conveyor chutes 17 may be placed in known manner in silo base 1.

In the upper area of the space enclosed by channel 5, the air draining chamber 18 is formed by a case 19 which is closed toward the bottom by a layer or partition 20 permeable to air. It is de-aerated through a pipe line 21. The air path is indicated by small arrows. The air draining chamber 18 is, of course, closed at the end of channel 5 that is adjacent to the silo, and in the embodiment shown, is also closed at the other end. It may be open at this other end when the conveying path of the material ends there in a chamber which is provided with a de-aerated upper space. Air draining chamber 18 ends, then, in the same open manner in this space as conveyance area 13.

Layer 20 permeable to air consists, e.g., of flexible fabric which under different operating conditions is differently bent or flexed and may also be moved, so that material that may have intruded can drop away therefrom. Such fabric as is used, e.g., for the covering of conveyor chutes may be considered essentially impermeable to material. Instead, a layer permeable to air may be used whose openings are so large that they let the particles of the material entirely or partially pass. The height of the air draining chamber 18 and the resistance of the layer 20 permeable to air for the material are then selected in such a way that the material passing through the layer 20 permeable to air is limited in such a way that it forms on the layer permeable to air a fluidized bed which may extend toward the end of the chute but occupies only such a small diameter of the air draining area that the drain of the air is not noticeably impeded.

Particularly when a layer essentially impermeable to the material is employed, purification or cleaning devices may be advantageous. It may be provided, e.g., that the air draining space be subject to excess pressure through means 38 for a short time and possibly in a pulsating manner, by which excess pressure material that has entered the layer is expelled. When several conveyor chutes of the kind described are operated for the draining of a silo in alternation, the purification can take place periodically at those conveyor chutes which happen to be out of operation.

Air draining chamber 18 may extend over the whole length of channel 5 or only over a portion thereof. It has the effect that the air supplied from conveyor chute 8 is drained over the whole distance from the material to be conveyed, so that the material is conveyed in the conveyance area 13 at constant velocity and density in a uniform manner and that in the course of the conveyor path an excess pressure is not built up in the conveyance area which checks or impedes the entry of loosening air. Therefore, the material to be drained off can also enter open end 14 and possibly further openings without being checked and can be conveyed over a long distance. Open ends 14 may therefore be provided in a relatively great number and at any spot of the silo based at moderate cost, so that a uniform draining can be assured.

Figure 2:
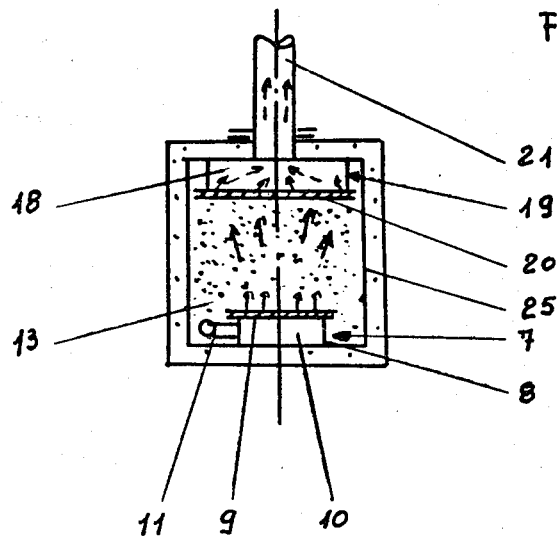
FIG. 2 is a cross section through the channel according to FIG. 1.
Figure 4:
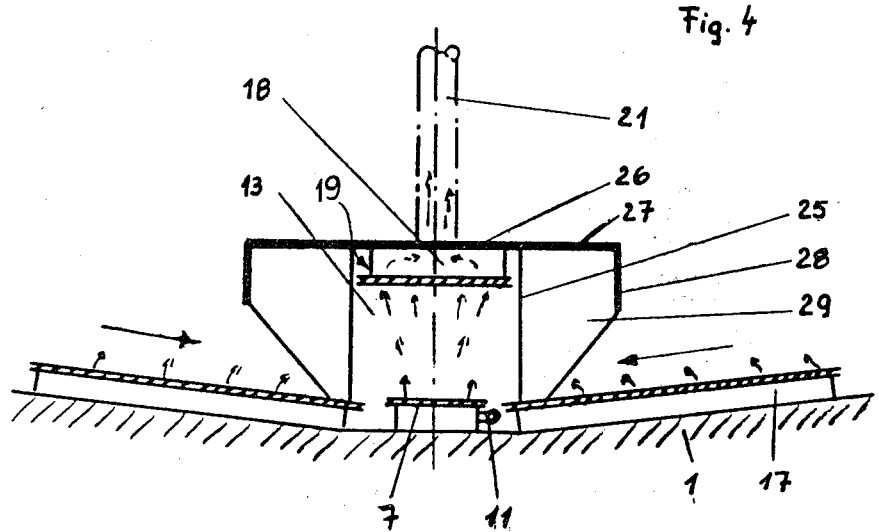
FIG. 4 is a section through the arrangement of FIG. 3, taken along line IV—IV.
Figure 3:
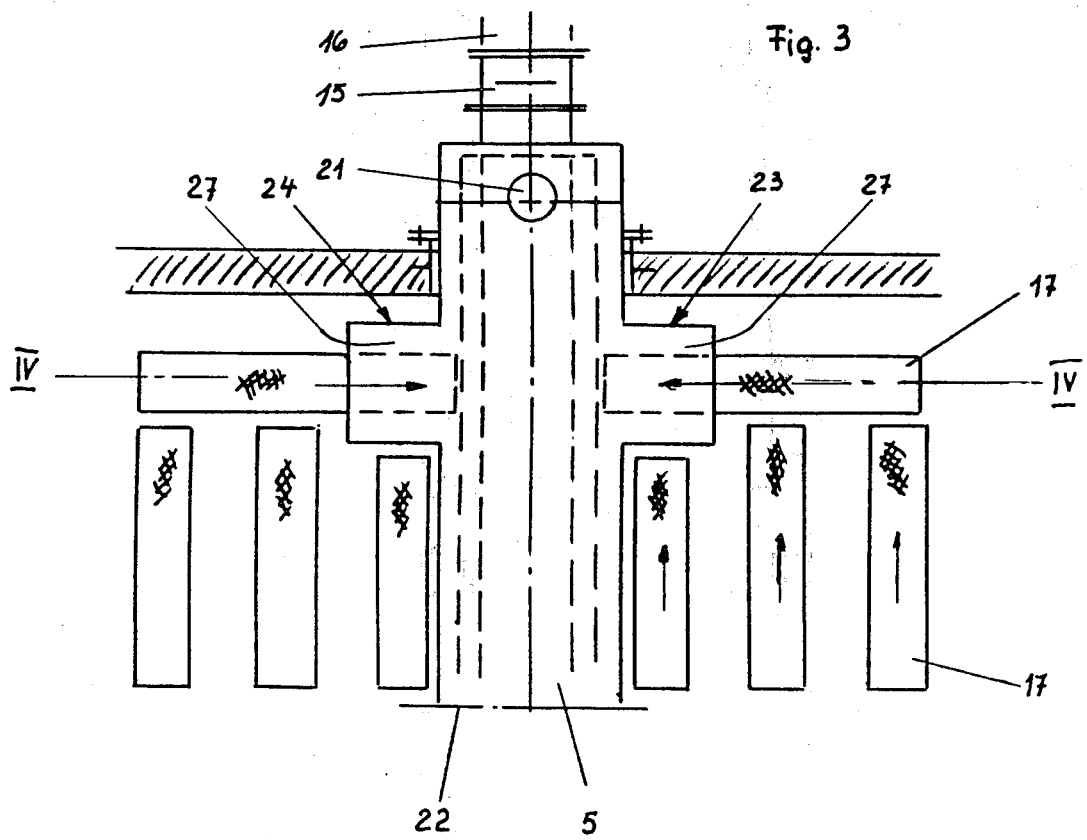
FIG. 3 is a plan view upon a conveyor chute arrangement.

FIG. 3 shows in plan view a conveyor chute arrangement whose channel 5 may generally be of the structure described in relation to FIGS. 1 and 2. Particularly, it should be assumed that it is continued beyond a cutting line 22 toward a terminal open end 14. It differs from the channel of FIGS. 1 and 2 in that at 23 and 24 lateral openings are provided to which the material is fed from open conveyor chutes 17 in the direction of the arrows, which chutes may slope in conveying direction. Lateral walls 25 of channel 5 are broken in this area, channel ceiling 26 being extended for the formation of laterally projecting copings 27 which terminate in rounded edges 28 and are laterally (i.e. transversely to the main direction of channel 5) connected with lateral walls 29. Thereby a screen is produced for the area where chutes 17 enter channel 5, which screen protects this area from disturbing influences from the silo space. It is also feasible to provide a multiplicity of lateral openings 23, 24 over the length of channel 5.

FIGS. 5 and 6 show a silo space 30 which is limited by a silo base 31 and silo walls 32, as well as by a transversely extending man-size channel 33. Open conveyor chutes 17 and channels 5 of the kind explained above are placed upon the silo base in such a manner that they end in channel 33, either in an open manner or in further conveyor devices provided therein. De-aerating devices 21 and a separator 34 for solid substances possibly contained in the drained-off air are visible in channel 33.

In the left half of FIG. 6, a chute arrangement is shown wherein a channel constructed according to the invention comprises a main channel 5a connected with several branch channels 5b, to which the material can be fed through lateral openings 23, 24. In addition, open conveyor chutes (not shown) may be provided.

In the arrangement on the right side of FIG. 6, a channel 5 with lateral openings 23, 24 is used to which the material can fed through open conveyor chutes 17 in the manner explained with reference to FIG. 3. The same arrangement may also be provided in channels 5c. Of course, however, it would also be possible to place such channels 5c without lateral openings in such a manner that their end openings are distributed with sufficient uniformity over the silo base surface.

FIG. 7 shows a chute arrangement wherein a group of open conveyor chutes 17 is arranged in each case on one side of a channel 5d which on this side is open over its entire length. Conveyor chutes 17 as well as channel 5d slope in the conveyor direction indicated by an arrow. Channels 5d lead to a main channel 5e which supplies the material to the outlet opening arranged at the side of the silo.

FIG. 8 illustrates how the cross section of channels 5d and the connection of the open conveyor chutes 17 may be formed. Channel 5d which is provided with a conveyor chute 7 and an air draining area 18 in the manner described above, is closed only on side 35 and by a cover surface 36, while it is open on side 37, in which structure cover surface 36 is corbelled toward side 37 in order to screen off the entry area of the open conveyor chutes 17.

What is claimed is:

1. A silo capable of containing particulate material and having unloading means comprising a channel positioned in said silo at a relatively slight downwardly outwardly disposed incline terminating externally of said silo, said channel having an imperforate bottom, first sidewalls, and an imperforate top wall, a pneumatic conveyor chute disposed internally along the bottom of said channel, said pneumatic conveyor chute having a bottom, sidewalls and perforated top, air pressure means adapted and constructed to supply pressurized air to said pneumatic conveyor chute whereby said air is distributed into said channel through said perforated top, a air draining chamber disposed internally along the top of said channel and vertically displaced from said pneumatic conveyor chute, said air draining chamber having a top, sidewalls and a perforated bottom whereby air in said channel is removed, exhaust means adapted and constructed to drain air from said air draining chamber, said channel having at least one particulate receiving entrance located internally of said silo, said pneumatic conveyor chute extending internally within said silo beyond said channel at said entrance or entrances whereby particulate material is introduced into said entrance, said channel extending externally of said silo and having an opening for removal of particulate material.

2. The unloading means of claim 1 wherein the perforated bottom of said air draining chamber is flexible.

3. The unloading means of claim 1 or 2 wherein means is provided for air pressurizing reversibly the air draining chamber whereby to dislodge particulate material clogging said perforate bottom.

* * * * *